(12) United States Patent
Phillips et al.

(10) Patent No.: US 10,427,702 B2
(45) Date of Patent: Oct. 1, 2019

(54) MODULAR UTILITY CART WITH REMOVABLY POSITIONABLE BINS AND DRAWER

(71) Applicant: Suncast Technologies, LLC, Palm Beach Gardens, FL (US)

(72) Inventors: William J. Phillips, Batavia, IL (US); Michael R. Vogler, Oswego, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 15/784,815

(22) Filed: Oct. 16, 2017

(65) Prior Publication Data
US 2019/0111956 A1    Apr. 18, 2019

(51) Int. Cl.
| | |
|---|---|
| *B62B 3/04* | (2006.01) |
| *B62B 3/02* | (2006.01) |
| *A47B 31/00* | (2006.01) |
| *B62B 5/04* | (2006.01) |
| *B62B 5/06* | (2006.01) |
| *B62B 3/00* | (2006.01) |
| *B62B 3/10* | (2006.01) |

(52) U.S. Cl.
CPC .............. *B62B 3/04* (2013.01); *A47B 31/00* (2013.01); *B62B 3/005* (2013.01); *B62B 3/02* (2013.01); *B62B 3/10* (2013.01); *B62B 5/0461* (2013.01); *B62B 5/064* (2013.01); *A47B 2031/003* (2013.01); *A47B 2031/004* (2013.01); *B62B 2203/40* (2013.01)

(58) Field of Classification Search
CPC . A47B 31/00; B25H 1/04; B25H 1/12; B25H 3/00; B62B 3/02; B62B 1/10; B62B 1/12; B62B 1/26; B62B 3/003; B62B 3/004; B62B 3/005
See application file for complete search history.

(56) References Cited

U.S. PATENT DOCUMENTS

| | | |
|---|---|---|
| 1,097,163 A | 5/1914 | Brown |
| D302,064 S | 7/1989 | Delmerico et al. |
| 4,923,202 A | 5/1990 | Breveglieri et al. |
| D355,314 S | 2/1995 | Travis |

(Continued)

FOREIGN PATENT DOCUMENTS

| | | |
|---|---|---|
| CN | 201226994 Y | 4/2009 |
| GB | 669447 | 4/1952 |

(Continued)

*Primary Examiner* — Bryan A Evans
(74) *Attorney, Agent, or Firm* — McHale & Slavin, P.A.

(57) ABSTRACT

The present device provides a modular utility cart having configurable storage features which provide secure transportation for both large and small items. The basic cart construction includes a bottom platform having casters connected to the underside thereof, a top platform positioned above the bottom platform by four corner posts. The top and bottom platforms, as well as the corner posts, include various structural features which provide the modularity to the utility cart. The supports include notches and pockets that allow for removable bins to be positioned along the supports, as well as supports for shelving of various sizes. The top platform has an integrated tool rail configured to support and suspend items such as hand tools, ladder racks, bins, and additionally includes an adjustable height handle.

19 Claims, 15 Drawing Sheets

(56) References Cited

U.S. PATENT DOCUMENTS

| | | |
|---|---|---|
| 5,588,659 A | 12/1996 | Boes et al. |
| D381,168 S | 7/1997 | Delmerico et al. |
| D391,032 S | 2/1998 | Delmerico |
| 5,816,419 A | 10/1998 | Lamson |
| 5,915,723 A | 6/1999 | Austin |
| 5,971,512 A | 10/1999 | Swan |
| D487,604 S | 3/2004 | Van Landingham, Jr. |
| 6,767,019 B2 | 7/2004 | van Hekken |
| 6,827,357 B2* | 12/2004 | Calmeise .............. A47L 13/51 280/47.34 |
| D575,473 S | 8/2008 | Presnell |
| D578,269 S | 10/2008 | Van Landingham, Jr. |
| D608,071 S | 1/2010 | Presnell |
| D618,418 S | 6/2010 | Catron et al. |
| D618,419 S | 6/2010 | Catron et al. |
| 7,845,656 B2* | 12/2010 | Thompson .............. B25H 3/00 280/47.35 |
| 8,070,181 B2 | 12/2011 | Forrest et al. |
| 8,333,160 B2 | 12/2012 | Lin |
| 8,544,141 B1* | 10/2013 | Kyde ..................... A47J 47/18 15/257.7 |
| 8,550,284 B1* | 10/2013 | Morad ................ B65F 1/1473 220/262 |
| D817,584 S | 5/2018 | Phillips et al. |
| 2004/0227315 A1* | 11/2004 | Van Landingham, Jr. .................. A47B 31/00 280/47.35 |
| 2005/0280228 A1 | 12/2005 | Fernandes et al. |
| 2006/0232032 A1 | 10/2006 | Goldberg |
| 2009/0206569 A1* | 8/2009 | Begin ...................... B62B 3/04 280/47.35 |
| 2009/0230644 A1* | 9/2009 | Stanley .................... B62B 3/10 280/43 |
| 2010/0283227 A1 | 11/2010 | Perelli et al. |
| 2011/0068562 A1* | 3/2011 | Keffeler .............. A61G 12/001 280/651 |
| 2011/0079127 A1* | 4/2011 | Somogyi ............. B23D 47/025 83/471.3 |
| 2012/0061930 A1* | 3/2012 | Lin ......................... B25H 3/02 280/47.35 |
| 2013/0033014 A1* | 2/2013 | Yang ........................ B62B 3/02 280/47.35 |
| 2017/0072978 A1* | 3/2017 | Kopp ..................... B62B 5/067 |

FOREIGN PATENT DOCUMENTS

| | | |
|---|---|---|
| JP | H0575049 U | 10/1993 |
| WO | WO2004071843 | 8/2004 |

\* cited by examiner

MODULAR UTILITY CART WITH REMOVABLY POSITIONABLE BINS AND DRAWER

FIELD OF THE INVENTION

The present invention relates to a utility cart and, more particularly, to a light duty modular utility cart having various configurations which provide a variety of functions and applications.

BACKGROUND OF THE INVENTION

Utility carts are well-known and used by consumers, as well as various industries, to transport loads of all types. Utility carts are ordinarily provided with four corner supports, two or more platforms, such as a top and bottom platform supported by the corner supports, and four casters below the bottom platform. Such carts vary from inexpensive, consumer-oriented products, to those carts produced for commercial or industrial use; the commercial carts being considerably more rugged, adapted to withstand heavier loads, and consequently more expensive. Typically, utility carts are formed of steel or polymeric and/or resinous materials. The carts also typically include fixed or rotating casters to provide an easy way to transport heavy or bulky loads.

Conventional carts may also have accessories permanently attached to the cart for ease of storage and transport of various items. By way of example, some utility carts may have hooks for securing such items as electrical cords. Other utility carts may be fabricated having fixed shelves and bins that can be used for storage of items carried by the cart. For instance, the utility cart may include a plurality of vertically oriented stacks of bins to increase the storage accommodations of the cart.

Modular shelving units incorporated within a cart are also known in the art. Often these units include a number of shelves that can be attached to one or more of the corner supports, or even a sidewall, to support a number of shelf configurations. Prior art modular shelving units are typically held together by fasteners, such as screws, nuts and bolts. While this may result in a unit having structural integrity, assembly and reconfiguration of the unit is very difficult and may limit the usefulness of the cart. Repeated disassembly and reassembly for reconfiguration will often weaken the mounting structure and the shelving unit itself.

Another problem associated with prior art utility carts is the inability to easily lock or unlock the caster wheels in order to prevent the utility cart from rolling away when positioned on or traversing an inclined surface. Thus, what is needed in the art is a utility cart having a front caster swivel-lock mechanism to facilitate easier locking and unlocking of the caster swivel function.

Yet another drawback related to utility carts concerns the handle used to maneuver the cart. For example, most utility carts have a fixed push handle attached to the top platform in order to help the user maneuver the cart in various directions. Unfortunately, these handles may be at a disadvantageous position for the user if the load on the cart is heavy or the person pushing the cart is not within a specific range of height. Cart pushing and pulling are common dynamic tasks in the industrial environment. During these tasks, a user must exert enough force to move the cart and be ready to catch the cart in the event that the cart moves or stops unexpectedly. This potential instability often causes the user to take smaller steps or adopt awkward postures due to the position of the handle, resulting in over-exertion injuries. Accordingly, there is a need for a utility cart with an adjustable handle that provides comfort through adjustable height handle positions to allow for more advantageous maneuvering of the utility cart regardless of the load placed on the cart or the height of the user; thereby allowing the potential effect on posture and the resulting lower-back loading to be taken into account by the user in determining the appropriate handle location.

Thus, it would be desirable to have a modular utility cart which can be quickly assembled and reconfigured in different arrangements for a number of different uses, with the added benefit of not weakening the structural integrity of the cart. The cart should include shelving that can be quickly mounted and repositioned in a variety of positions with little or no hardware for the user to contend with. The modular utility cart should be relatively light weight and assemble without the need for excessive tools or strength on the part of the assembler. The modular utility cart should be adaptable to different storage requirements, and yet should be secure enough when assembled that it will not inadvertently become dismantled or unstable while in use. Still yet, the utility cart should include an adjustable handle assembly and remotely operable caster lock features. The modular utility cart should also be configurable to store and transport items not typically moved with a utility cart, such as ladders, cords and round items that roll uncontrollably when moved. The modular utility cart should also be configurable to include at least one drawer which can be latched in a closed position to prevent inadvertent opening during traversal of the cart.

SUMMARY OF THE INVENTION

The present device provides a modular utility cart having configurable storage features which provide secure transportation for both large and small items. In particular, the modular utility cart is configured to include wide and/or narrow shelving, secured bin storage, hand tool storage, side wall securement, round part storage, small part storage, an adjustable ergonomic handle and lockable casters. The basic cart construction includes a bottom platform having casters connected to the underside thereof, and a top platform positioned above the bottom platform by four corner posts. The top and bottom platforms, as well as the corner posts, include various structural features which provide modularity to the utility cart. The corner posts include notches and pockets that allow for removable bins to be positioned along the corner posts, as well as supports for shelving of various sizes. The top platform has an integrated tool rail configured to support and suspend items such as hand tools, ladder racks and bins, and additionally includes an adjustable height handle. Some embodiments also include a lockable drawer secured to the bottom of the top platform. The bottom platform provides a structural base and includes the casters, as well as the caster locking mechanism and rub rails to prevent upper portions of the utility cart from dragging on wall surfaces, machinery and the like.

Accordingly, it is an objective of the present invention to provide a modular utility cart.

It is another objective of the present invention to provide a modular utility cart having an adjustable handle that provides ergonomic positioning for the user.

It is yet another objective of the present invention to provide a modular utility cart having an integrally formed tool rail around the perimeter of the top platform for the addition of storage accessories, bins, cord wraps, and the like, as well as hand tools.

Still another objective of the present invention is to provide a modular utility cart having integrated connectors in various positions of the utility cart for cooperation with shelving, racks, and small and large storage bins.

Another objective of the present invention is to provide a modular utility cart providing increased functionality and organization to the integrated and flexible storage capabilities.

Yet another objective of the present invention is to provide a modular utility cart having a caster swivel-lock mechanism to facilitate locking and unlocking of the swivel feature of the casters.

Still another objective of the present invention is to provide a modular utility cart having increased maneuverability and controllability due to the adjustable handle height and the foot actuated caster swivel-lock mechanism.

Another objective of the present invention is to provide a modular utility cart having a tool rail extending around the perimeter of the top platform for interlocking attachment of accessories, such as a ladder rack, which allows for a ladder to be carried alongside the utility cart.

Still yet another objective of the present invention is to provide a modular utility cart having the ability to include securable drawers for storage along the bottom surface of the top platform.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
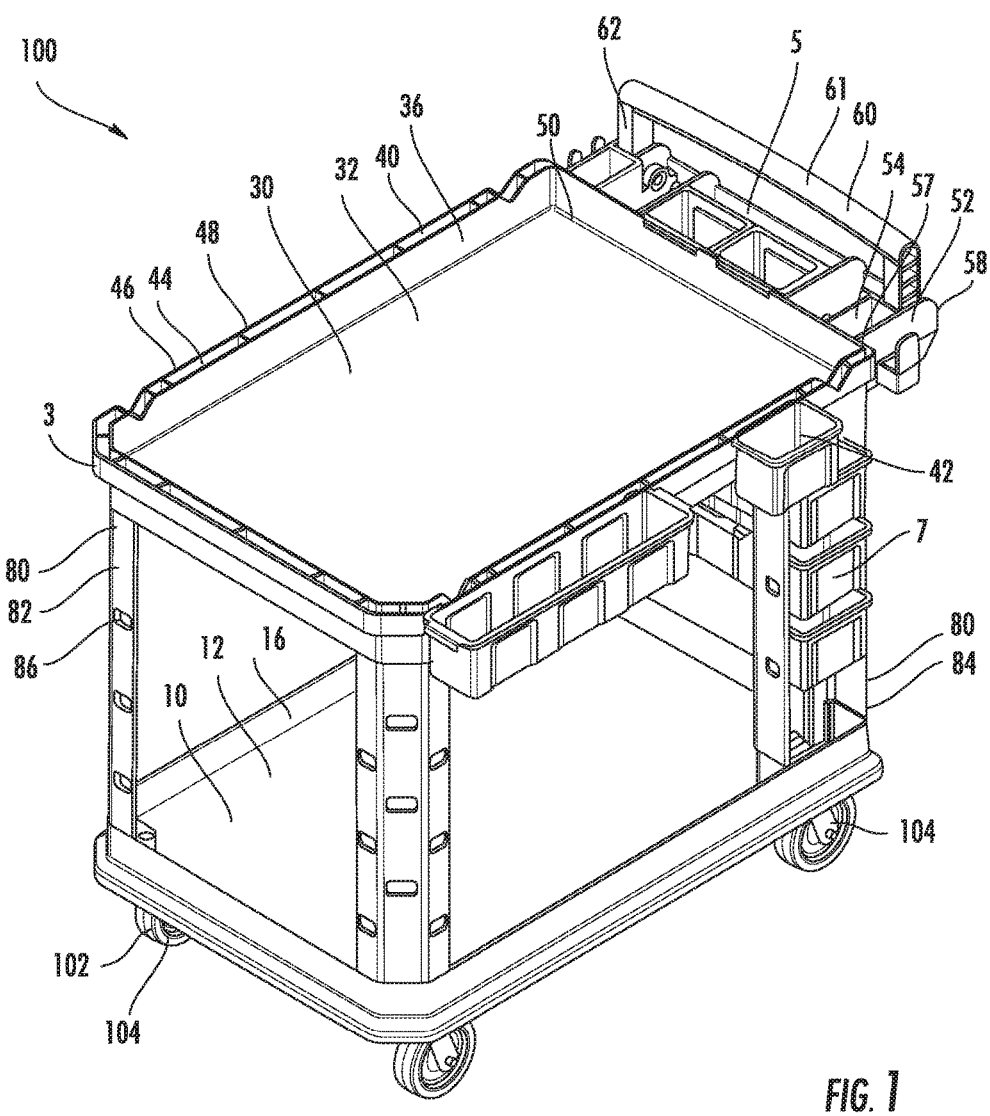
FIG. 1 is a top perspective view of the modular utility cart illustrated with removable bins secured to the tool rail and the support posts.
Figure 2:
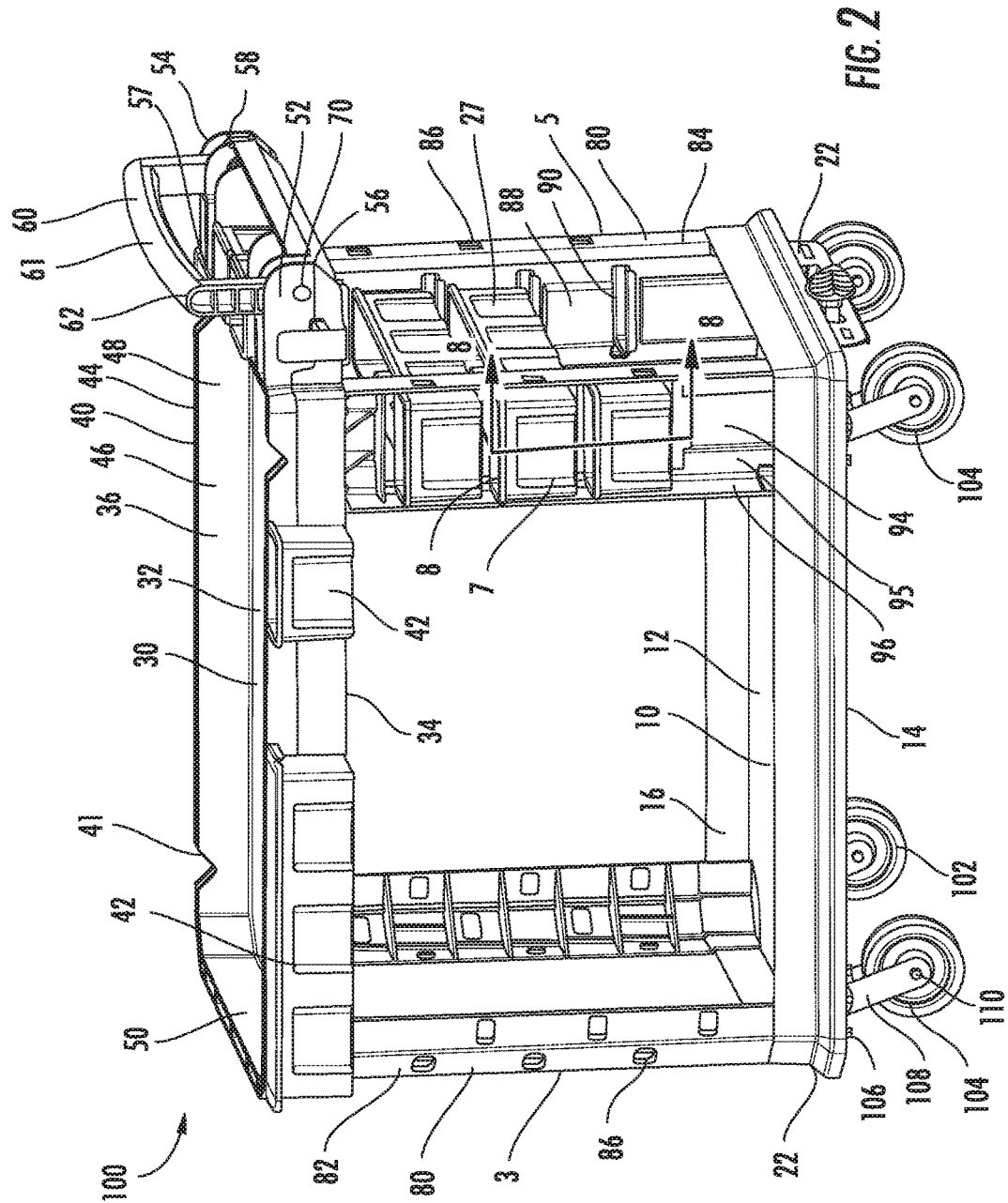
FIG. 2 is a side perspective view of the modular utility cart illustrating the configurable bins, locking casters and ergonomic handle.
Figure 3:
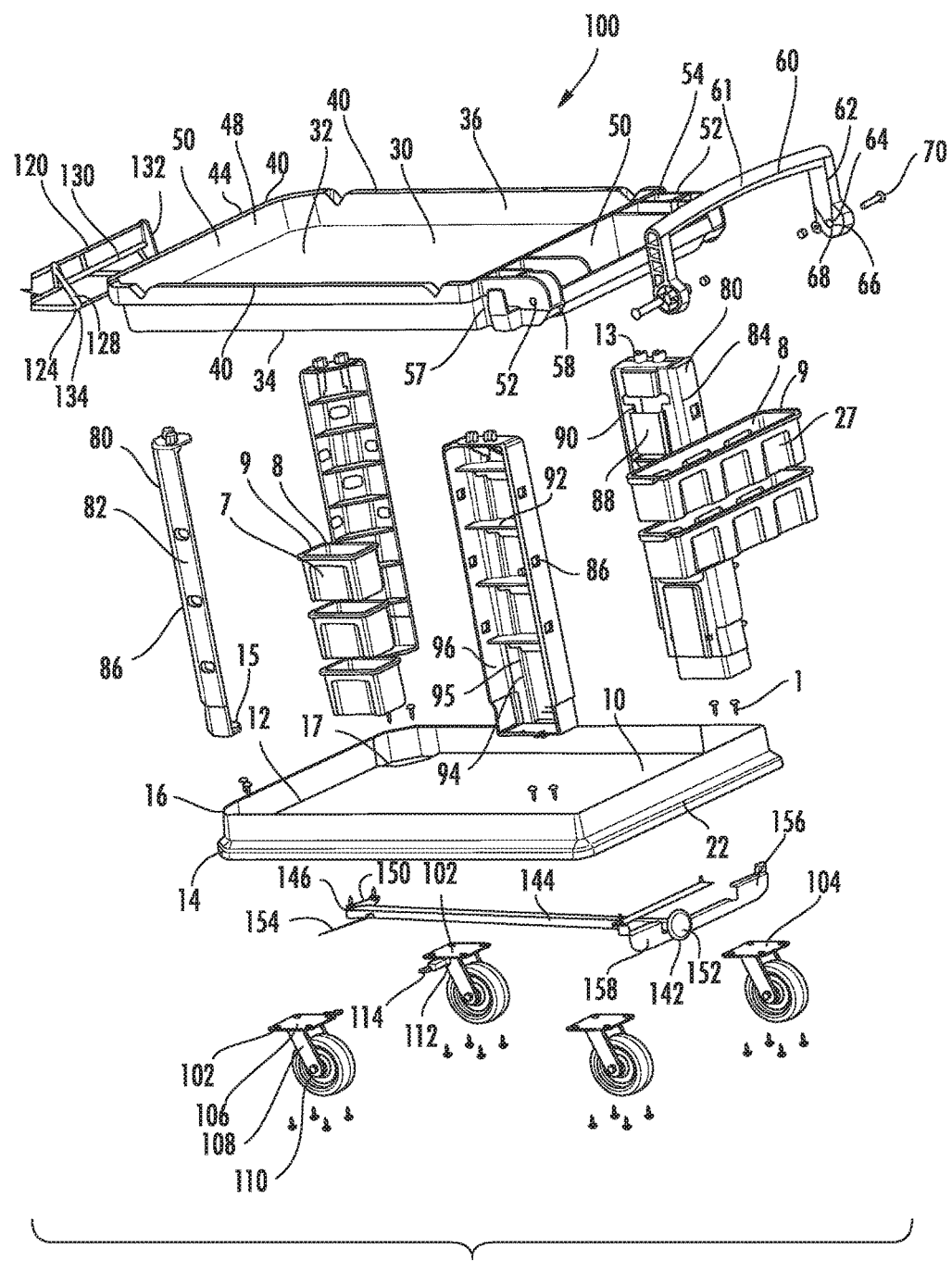
FIG. 3 is an exploded view of the modular utility cart illustrating the various connectors between the components.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 4:
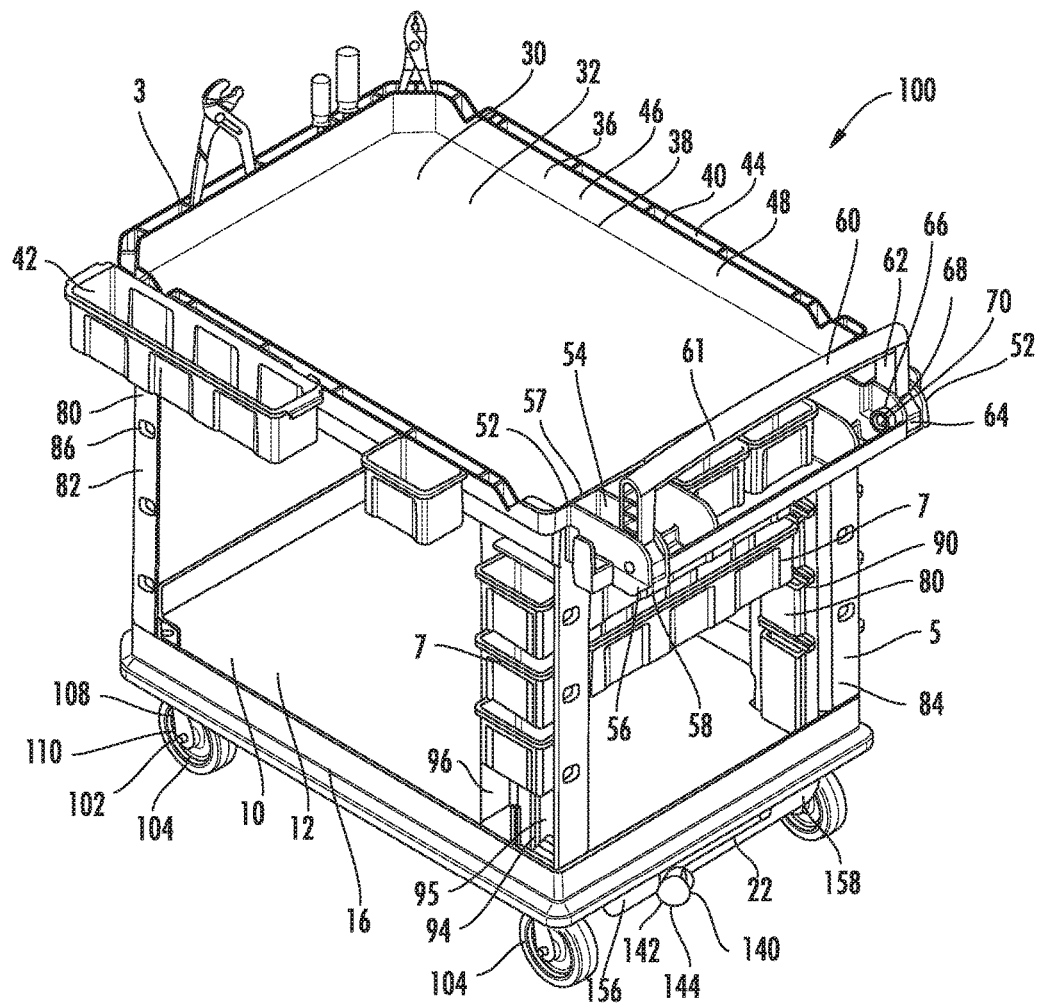
FIG. 4 is a top rear perspective view of the modular utility cart.
Figure 5:
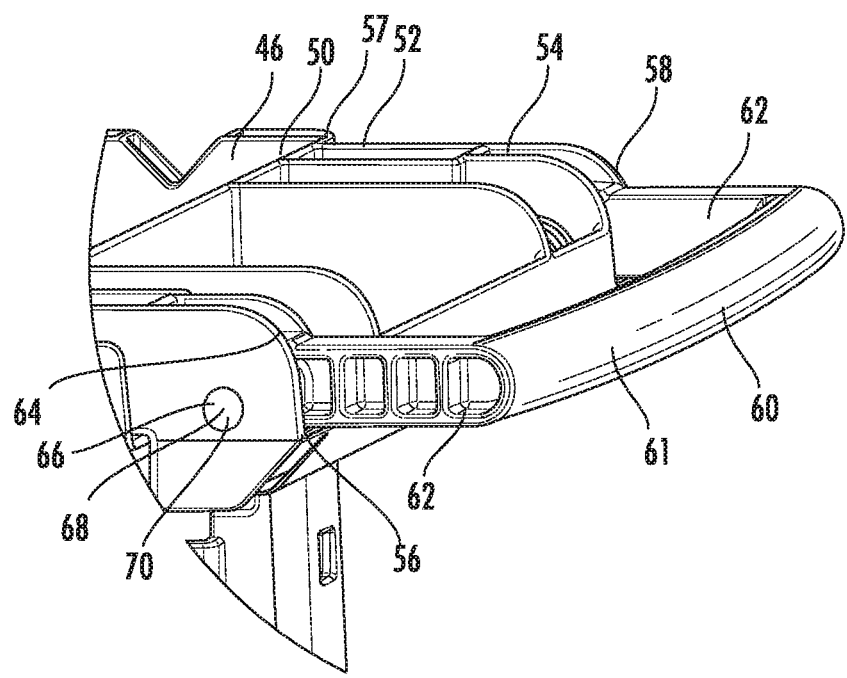
FIG. 5 is a partial top perspective view illustrating the ergonomic handle in a lowered position.

Referring now to FIGS. 1-14, the present invention relates to a modular utility cart 100 including a bottom platform 10 and a top platform 30 separated vertically by a plurality of support posts 80. Fasteners 1 and intermeshing keys 13 cooperate with conjugately shaped sockets (not shown) integrally formed on the bottom surface 34 of the top platform 30 to secure the assembly together to suitably support a substantial amount of weight for transport or storage. The intermeshing keys 13 and conjugately shaped sockets cooperate to prevent racking of the cart during transport of heavy loads. The top platform 30 includes an ergonomic handle 60, which may be adjusted for positioning by the user. As shown in FIGS. 4 and 5, flanges 52 extend outwardly from and are positioned along opposite edges of the short-sided end 50 of the top platform 30. Each flange 52 is constructed as an open channel 54, with the bottom portion 56 of each flange 52 being closed. A first, or proximal, end 57 of each flange 52 is integrally formed as a portion of the top platform 30, while a distal end 58 is sized to accommodate one leg portion 62 of the handle 60. The handle 60 is preferably U-shaped, having a first and second leg 62 connected with a crossbar handle 61. Each leg 62 is sized to be retained within the distal end 58 of each flange 52. Each leg 62 has a polygonal shaped 64 end, whereby each side on the polygon abuts against the closed bottom portion 56 of the flange 52 to create a different fixed height for the handle 60. The axis of rotation 66 for the handle 60 is located on the center of the polygon 68 with a connection means 70, such as a nut and bolt assembly, to the channel 54 on the flange 52. Thus, by loosening the fastener, a user may re-index the handle 60 to a new position.

Figure 6:
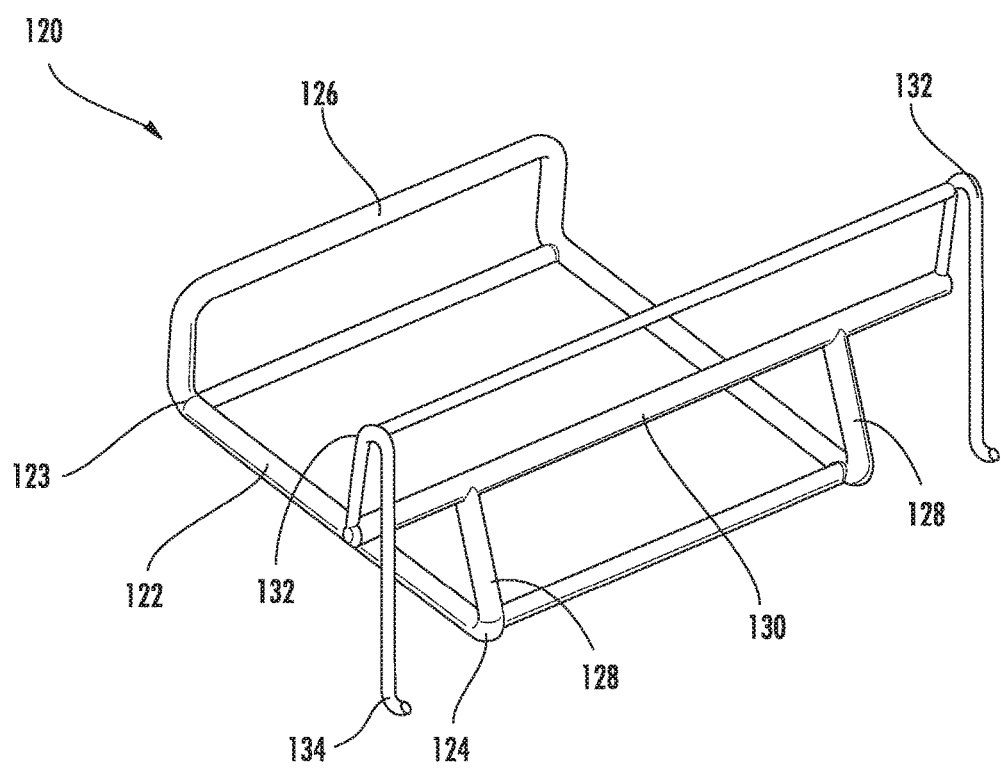
FIG. 6 is a top perspective view illustrating a ladder rack securable to the tool rail of the modular utility cart.
Figure 7:
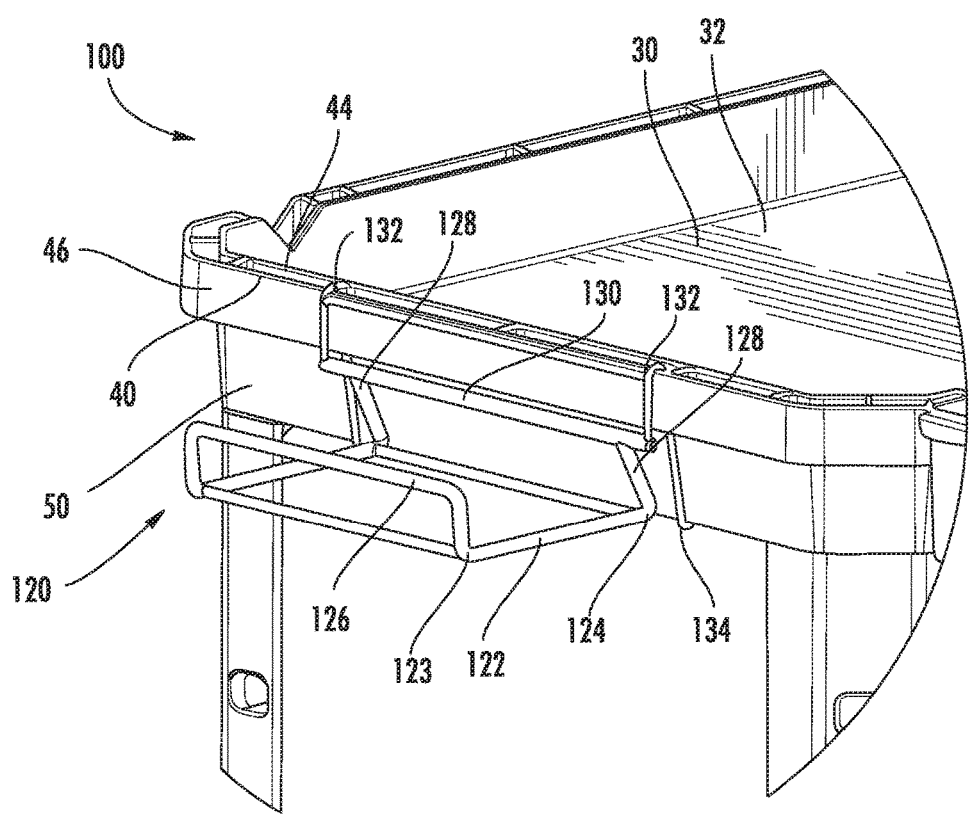
FIG. 7 is a partial top perspective view of the ladder rack attached to the tool rail of the modular utility cart.
Figure 8:
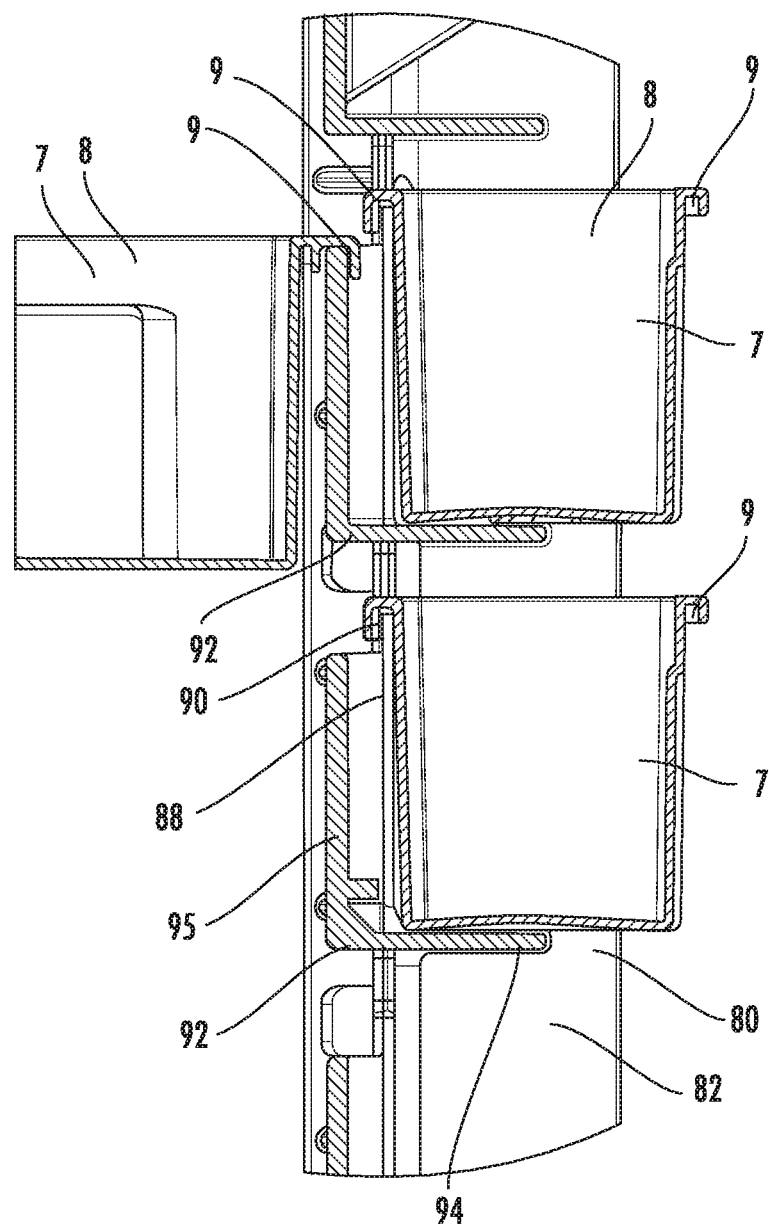
FIG. 8 is a partial cross-sectional view taken along lines 8-8 of FIG. 2, illustrating a support post in cooperation with storage bins.
Figure 9:
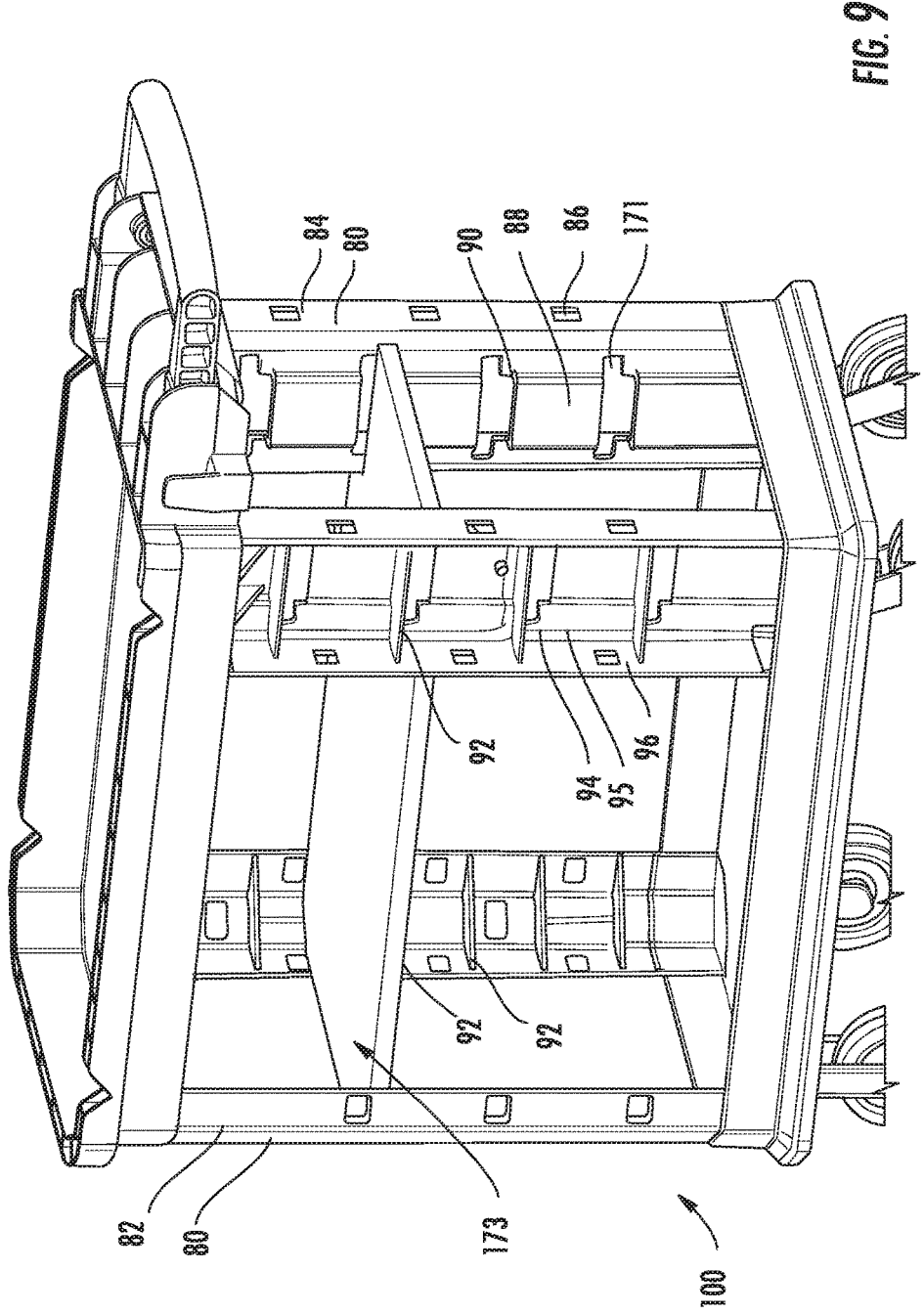
FIG. 9 is a side perspective view illustrating a shelf in cooperation with the support posts of the modular utility cart.
Figure 10:
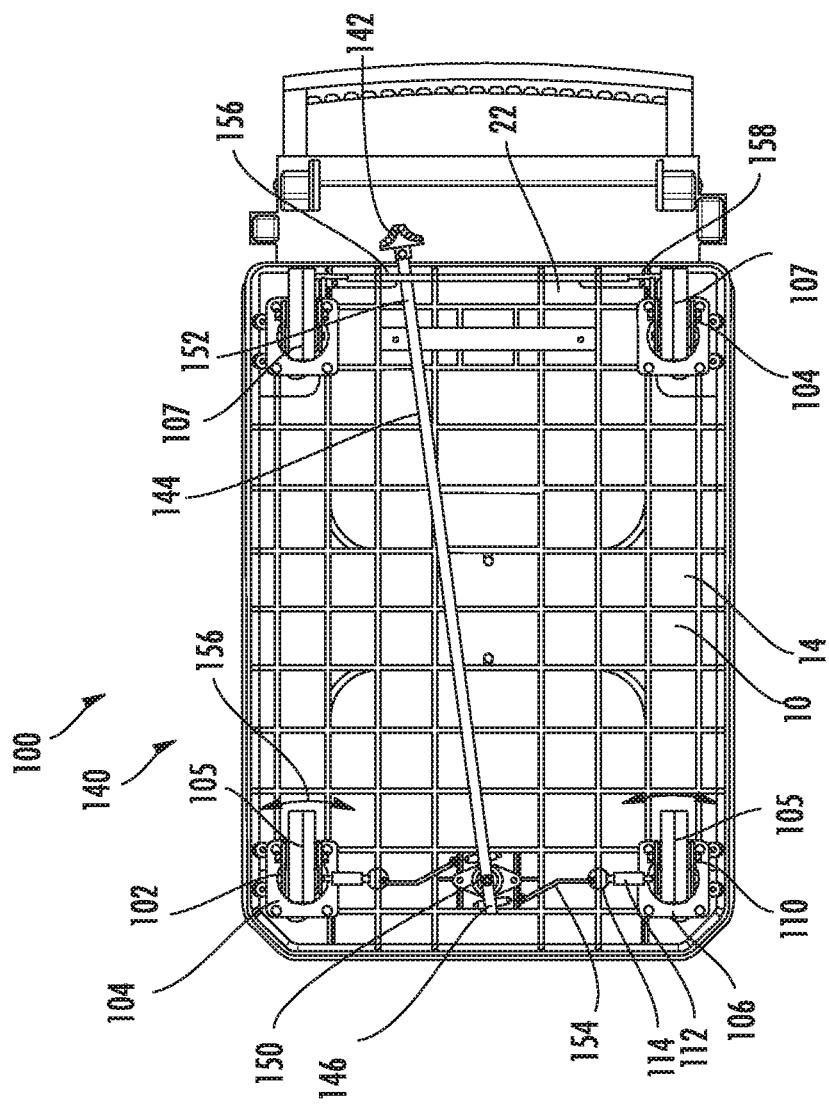
FIG. 10 is a bottom view of the modular utility cart, illustrating the caster locking assembly.
Figure 11:
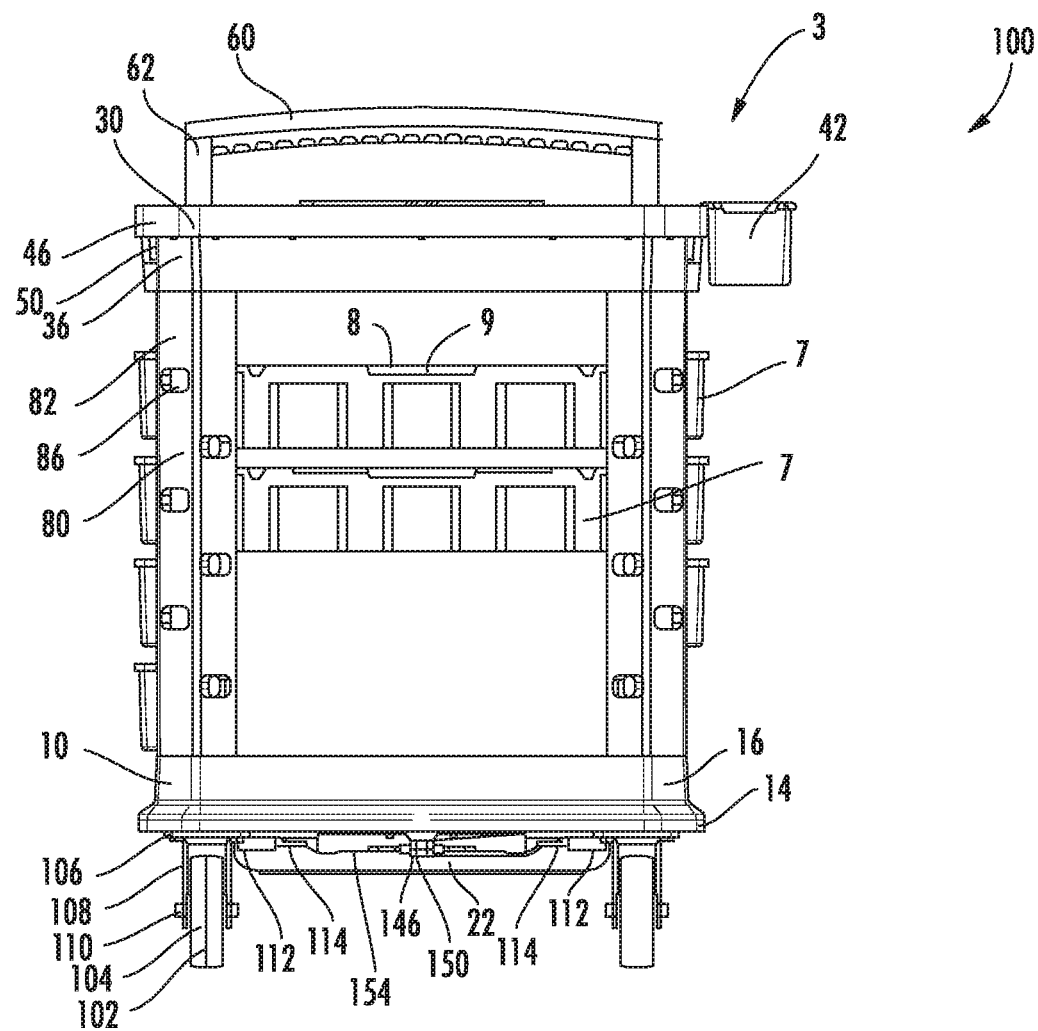
FIG. 11 is a front view illustrating bins connected to the tool rail, as well as the support posts of the modular utility cart.

An integrated tool rail 46 extends in a spaced and substantially parallel arrangement around the perimeter of wall 36 of the top platform 30 for additional storage configurations. Standoffs 44 provide several open grooves 40 sized to cooperate with various hand tools, such as screw drivers, pliers, wrenches and the like, to retain the tools with free access for use. The open grooves 40 also provide a space for hooking storage bins 42 which may be constructed in various lengths and sizes. The storage bins 42 are provided with hooks 9 sized to fit within the open grooves 40, and further include rotatable or snap type locks (not shown) which prevent the bins from becoming dislodged from the grooves, even if transported across rough terrain. V-grooves 41 are provided on the top platform 30 for storage and transport of round items. The V-groove 41 reduces the tendency of round items to roll or move uncontrollably during movement of the modular utility cart, allowing the user to keep both hands on the utility cart handle 60. The positional relationship between the V-grooves 41 and the tool rail 46 allow bungee cords or other types of tie down mechanisms to be utilized to further stabilize items positioned in the V-grooves. As illustrated in FIGS. 6 and 7, other accessories provided with a hook, such as a ladder rack 120, are securable to the tool rail 46. The ladder rack 120 is constructed of a steel wire that is attachable to the tool rail 46 via secured, elongated hooks 132. In operation, the secured hooks 132 are merely inserted into the tool rail 46, whereby the rear side 124 of the ladder rack 120 presses against a side surface of the top platform 30 with a terminating end 134 of the secured hooks 132 positioned under the bottom surface 34 of the top platform 30. The terminating ends 134 of the secured hooks 132 catch against the bottom surface of the top platform 30 to prevent the ladder rack 120 from becoming dislodged from the cart during transport. The ladder rack 120 is generally constructed and arranged to support and hold a ladder when hooked onto the tool rail 46. The ladder rack 120 is comprised of a quadrilateral base 122, a U-shaped front bar 126, a pair of rear angled bars 128, a cross brace 130, and the pair of hooks 132. The quadrilateral base 122 is sized to accept a ladder, thereby being at least a size to hold the width of a standard ladder. On the distal side 123 of the base 122 is an inverted U-shaped front bar 126 to keep the ladder in place. On the rear side 124 of the base 122 is a pair of angled bars 128. The angled bars 128 are angled towards the U-shaped front bar 126. The angled bars 128 terminate at a cross brace 130 that is perpendicular thereto and extends a length further than the angled bars 128. It should be noted that, while the ladder rack 120 is described for support of a ladder, the ladder rack 120 could be utilized to support other tools, such as electrical extension cords and the like, without departing from the scope of the invention. It should also be noted that, while only one ladder rack is illustrated, a plurality of ladder racks may be secured to the tool rail 46 on the sides or front of the cart without departing from the scope of the invention.

Figure 14:
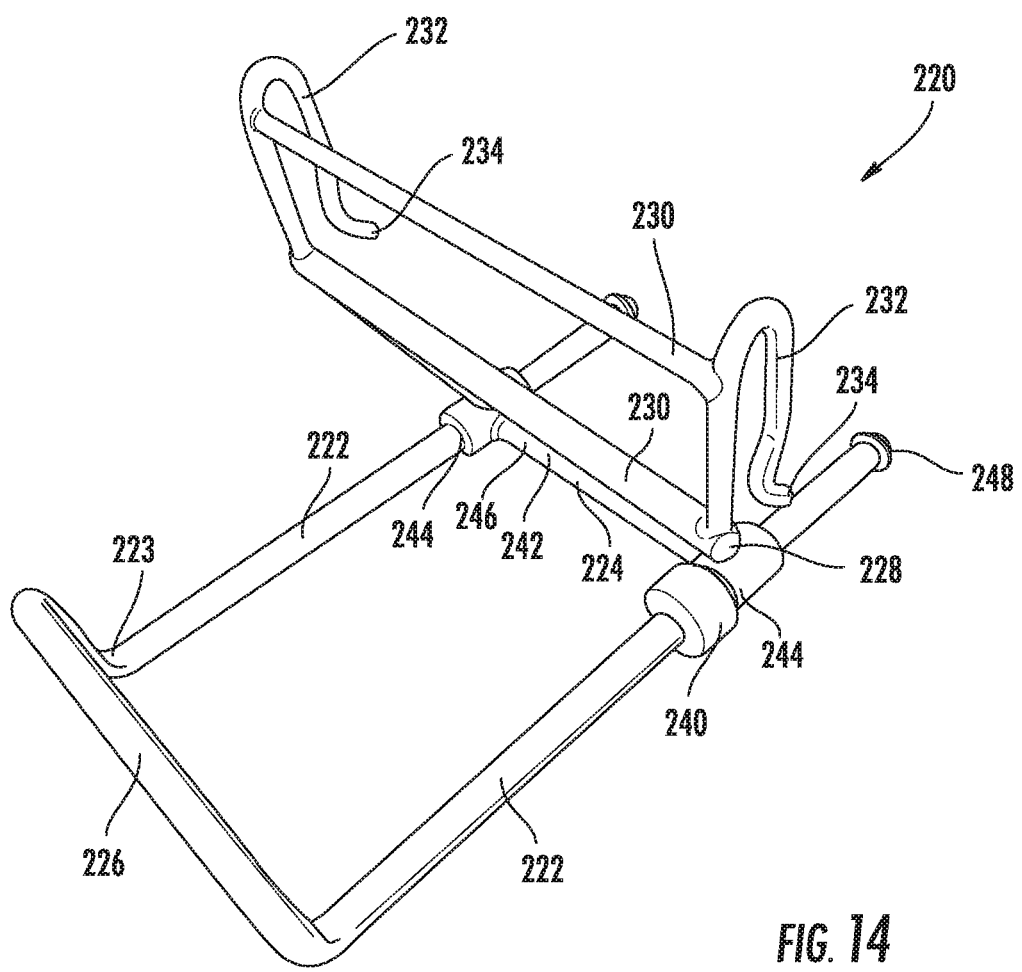
FIG. 14 is a top perspective view illustrating one embodiment of the ladder rack of the modular utility cart.
Figure 15:
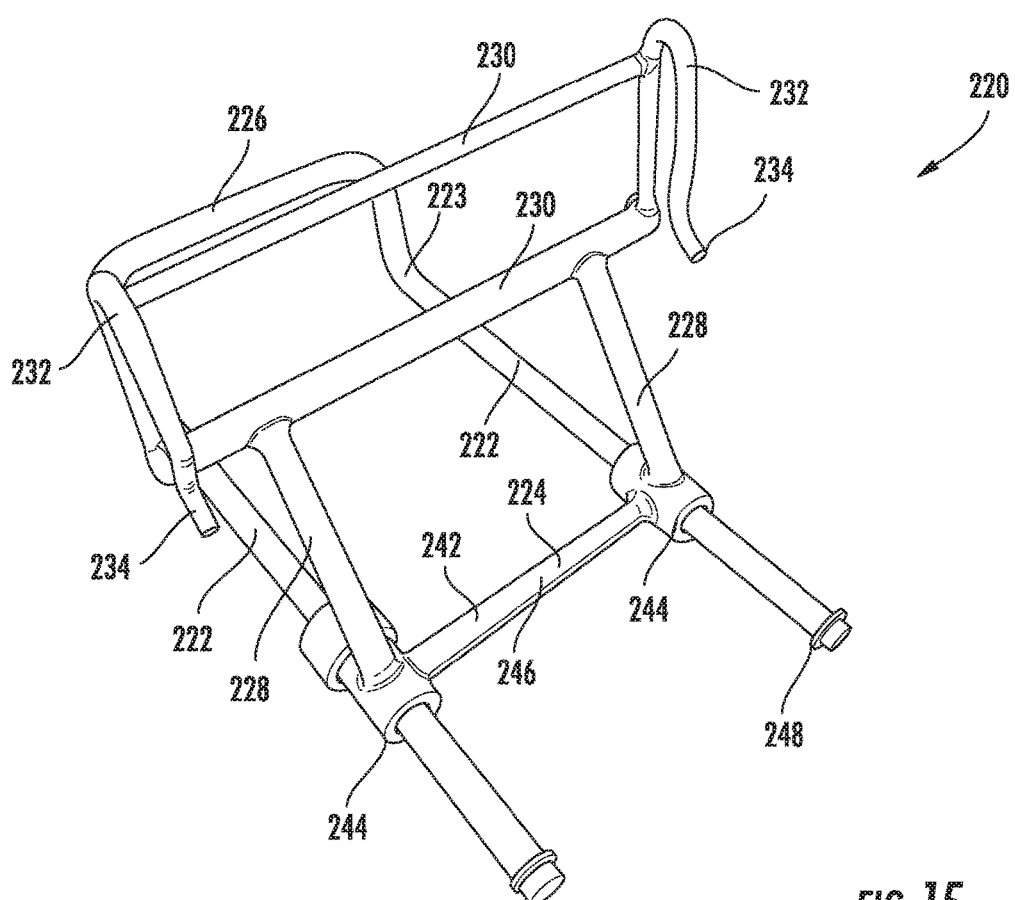
FIG. 15 is a back perspective view illustrating the embodiment of the ladder rack shown in FIG. 14.

An additional embodiment for the ladder rack 220 is also contemplated and shown in FIG. 14. The ladder rack 220 is constructed of metal tubing and is attachable to the tool rail 46 via secured, elongated hooks 232. In operation, the secured hooks 232 are inserted into the tool rail 46, whereby the rear side 224 of the ladder rack 220 presses against a side surface of the top platform 30 with a terminating end 234 of the secured hooks 232 positioned under the bottom surface 34 of the top platform 30. The terminating ends 234 of the secured hooks 232 catch against the bottom surface of the top platform 30 to prevent the ladder rack 220 from becoming dislodged from the cart during transport. The ladder rack 220 is generally constructed and arranged to support and hold a ladder when hooked onto the tool rail 46; however, this embodiment allows for the ladder base 222 to be elongated or shortened. The ladder rack 220 is comprised of an expandable ladder base 222, a U-shaped front bar 226, a pair of rear angled bars 228, at least one cross brace 230, a collet member 240, a base holding member 242, and the pair of hooks 232. The base 222 is expandable to accept a variety of ladder sizes. The ability to elongate the base 222 allows for, not only a variety of ladders to be mounted thereon, but also other items of various sizes. Additionally, the expandable base 222 allows an item to be mounted thereon and then allow the base 222 to be pushed inwardly to shorten the base 222 in order to create a snug fit, and to minimize any movement of the item thereon. On the distal side 223 of the base 222 is an inverted U-shaped front bar 226 to keep the ladder in place. On the rear side 224 of the ladder rack 220 is a pair of angled bars 228 and a base holding member 242. The angled bars 228 are angled in the same direction as the U-shaped front bar 226. The angled bars 228 start at a cross brace 230, wherein the cross brace 230 is perpendicular thereto, and extend to a length further than the terminating end 234 of the hooks 232 at the base holding member 242. The base holding member 242 includes a pair of openings 244 sized to accept the base 222 and a support bracket 246 between the pair of openings 244. Adjacent to at least one opening 244 is a collet member 240, which tightens and loosens to allow the base 222 to be set in place or slide freely through the pair of openings 244 on the base holding member 242. A pair of O-rings at the end opposite the U-shaped front bar 226 of the base 222 prevent the base 222 from being pulled too far from the openings 244 when the base 222 is being elongated.

Referring to FIGS. 1, 2, 3 and 8, the support posts 80 are illustrated. In general, the present device utilizes two different constructions of support posts to provide separation to the top and bottom platforms, as well as provide modularity to the utility cart. The first set of support posts 82 are attached at the front end 3 of the utility cart 100. The second set of support posts 84 are attached at the back end 5 of the utility cart 100. It should be noted that the first and second support posts could be reversed or positioned on either side of the utility cart without departing from the scope of the invention. The first set of support posts 82 are generally V-shaped when viewed from the top, having a radiused or beveled outer corner including a plurality of open notches 86 along the length thereof and a plurality of cross braces 92 for structural integrity. The cross braces 92 also function as shelving supports that provide variable spacing for user configuration without adding fasteners or the like to the assembly, while the notches 86 provide spaces for attachment of bin hooks 9 that can be attached outside of the support posts. The top surface of the first set of support posts 82 include at least one, and more preferably a plurality, of the intermeshing keys 13 that interlock with sockets formed into the bottom surface 34 of the top platform 30. A bottom plate 15 is integrally molded to the first support posts 82 for attachment to the bottom platform 10 with fasteners or the like. The bottom platform 10 preferably includes pockets 17 that are conjugately shaped with respect to the bottom plates 15 to help hold the bottom plates 15 in position under extreme loads.

Referring to FIGS. 1-4, 8, 9 and 11-12, the pair of second support posts 84 are each constructed to include an open faced U-shaped channel 94 having a back wall 95 and opposing sidewalls 96. The second support posts 84 are arranged so that the U-shaped channels 94 face outwardly. A plurality of open pockets 88 is located on the back wall 95. Each open pocket 88 has a top surface 90 that is sized to hold at least one bin 7, or at least one end of a larger bin 27; the larger bins having a hook member on each end for supporting more weight. In this manner, the larger bins 27 extend between the second support posts 84 and span the gap between them. Additionally, within the channel 94 is a plurality of cross braces that function as integral shelves 92. Each integral shelf 92 provides additional support for a bin 7 when placed within the pocket 88, more aptly shown in FIG. 8. Furthermore, the shelves 92 on the support posts 80 provide a base to hold a secondary platform 173 that can be placed between the top platform 30 and bottom platform 10, and extends from the front supports 82 to the back supports 84, shown in FIG. 9. Slots 171 are provided above the pockets 88 in the form of openings that are constructed to allow the secondary platform(s) to be slid into the slots 171 and through to the second support posts 84, where the distal ends of the secondary platform(s) 170 are supported by the cross braces 92 of the first support posts 82. It should be noted that this construction permits the user to configure the utility cart with the secondary platform(s) 170 and the bins 7, 27 in the same utility cart. Individual bins 7 can be placed within the open faced channel 94 or, alternatively, larger bins 27 can be placed between the support posts 80 and attached to opposite support posts 80 on opposite pockets 88. The bins 7 are generally comprised of an open container 8 having at least one hook 9 disposed about the edge of the open container 8 for collaboration with the top of each pocket 88. Apertures 86 are provided in both the first and the second support posts 82, 84 for attachment of other accessories (not shown), which may include extension cord hooks, tool hooks or the like, further adding versatility to the utility cart 100.

Referring to FIGS. 1-4 and 9-12, the bottom platform 10 includes casters 104 for movement of the modular utility cart 100. In general, the bottom platform 10 includes a pair of steering casters 105 and a pair of non-steering casters 107. The steering and non-steering casters are secured to integrally formed bosses positioned on the bottom surface 14 of the bottom platform 10. The steering casters 105 include a locking assembly 140 that allows the two steering casters to either rotate freely for steering in a swivelable position 156 or be locked in a unidirectional position 158 with a user activated actuator 142. The steering casters 105 are each comprised of a mounting member 106 attached to the bottom surface 14 of the bottom platform 10. More specifically, a fork 108 is connected to the mounting member 106 for swivelable movement about a swivel bearing in a generally vertical axis. A locking cylinder 112 is integrally secured to the mounting member 106 for locking a bearing support 110 to the mounting member 106 with a locking pin 114. The locking pin 114 is selectively engageable and disengagable to lock or allow free turning of the swivel bearing for swivelable or unidirectional movement of the caster wheel via the user operated actuator assembly 142. The user operated actuator assembly 142 is carried on the bottom surface 14 of the bottom platform 10 and is connected to the locking pin 114 on each of the steering casters 105, permitting unidirectional or swivelable movement of the steering casters 105. The actuator assembly 142 includes an actuator arm 144 having a first end 146, a pivot point 150, and a second end 152 attached to the bottom surface 14 of the bottom platform 10. The first end 146 is positioned between the front end swivel-lock caster wheels 102, and each locking pin 114 on each of the front end swivel-lock caster wheels 102 is connected to the first end 146 of the actuator arm 144 via drag links 154. The second end 152 extends horizontally beyond and through the back end sidewall 22 on the bottom platform 10, and is moveable in a horizontal plane parallel to the bottom platform 10 between a swivelable position 156 and unidirectional position 158. The movement of the second end 152 of the arm 144 to a swivelable position 156 withdraws or unlocks the locking pin 114 from the swivel bearing on each of the front end swivel-lock caster wheels 102 to allow for swivelable movement of the front end swivel-lock caster wheels 102. The unidirectional position 158 locks the locking pin 114 on the front end caster wheels 102 to only allow for unidirectional movement. Having a foot actuated means to switch between a unidirectional movement 158 and swivelable movement 156 of the front end swivel-lock caster wheels 102 allows the user to keep hold of the handle 60 while operating the utility cart 100. Although not shown, it should be noted that the non-steering castors 107 can include a wheel brake without departing from the scope of the invention. The topside 12 of the bottom platform 10 includes a perimeter barrier 16 to contain small items.

Figure 12:
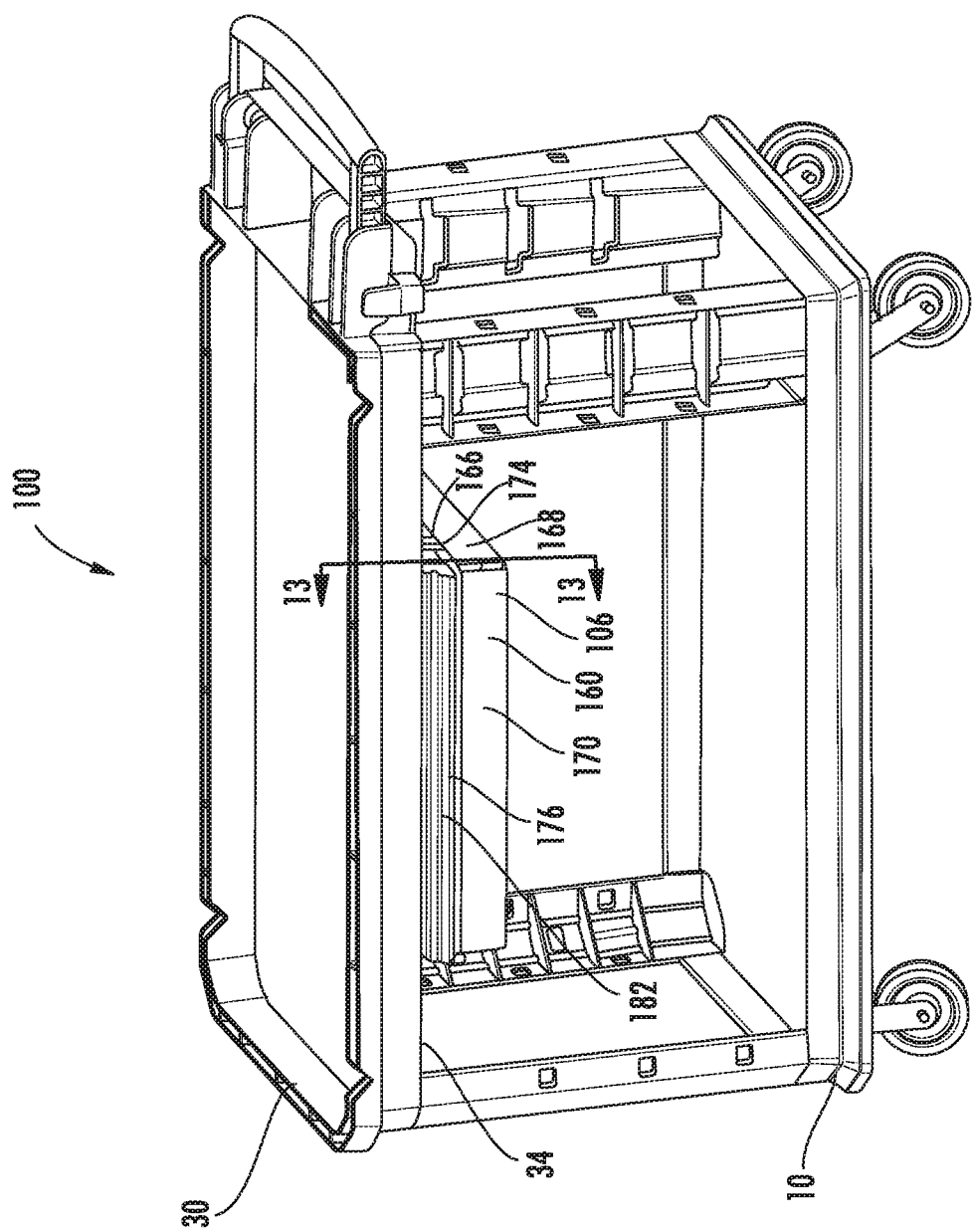
FIG. 12 is a top side perspective view illustrating a drawer secured to the bottom surface of the top platform of the modular utility cart.
Figure 13:
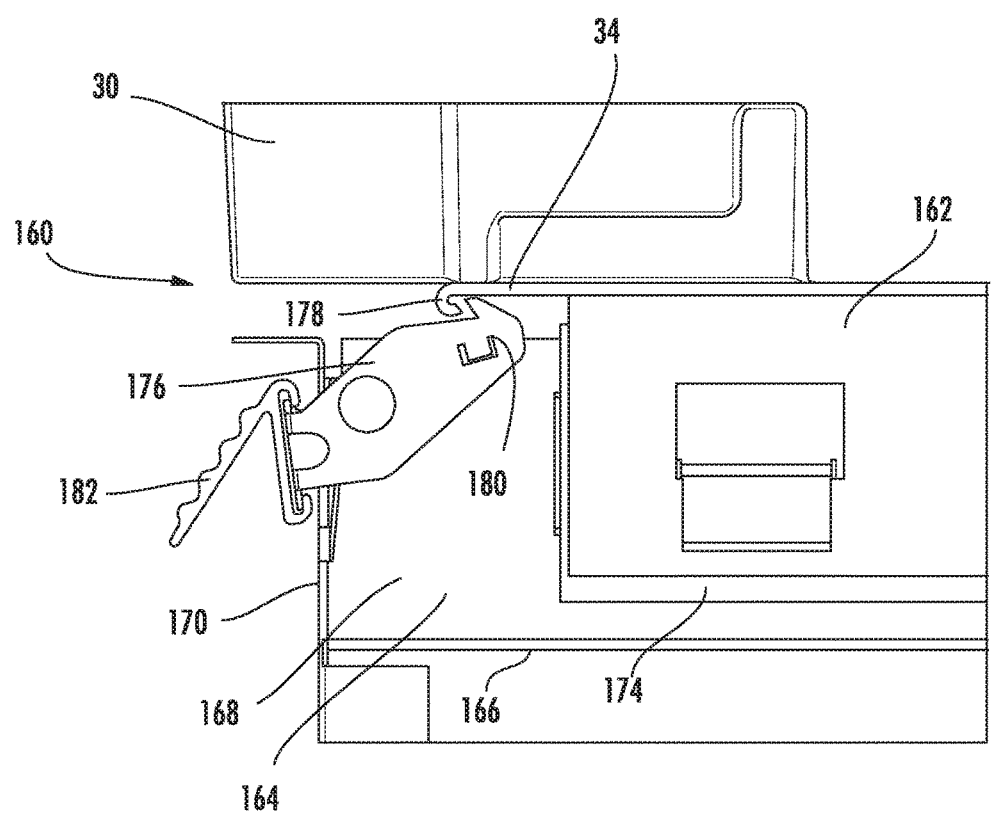
FIG. 13 is a partial cross-sectional view taken along lines 13-13 of FIG. 12, illustrating one embodiment of the latch assembly of the drawer.

As shown in FIGS. 12 and 13, the utility cart 100 can be provided with a drawer 160. The drawer 160 is supported in the space between the bottom platform 10 and the top platform 30, specifically on the bottom surface 34 of the top platform 30, by use of attachment hardware (not shown). The drawer 160 is configured to be moveable between a closed position and an open position. The drawer 160 is comprised of a pair of tracks 162 that are mounted to the bottom surface 34 of the top platform 30 and spaced to hold and retain the drawer 160 and an open top drawer container 164. The open top container 164 includes a bottom portion 166, side portions 168, a front face portion 170 and a rear portion 172. The side portions 168 include corresponding tracks 174 that cooperate with the opposing tracks 162 in order to slide the drawer 160 from an open and closed position. The front face portion 170 includes a lock mechanism 176 so that the user may secure the drawer 160 in a closed position. The lock mechanism 176 is comprised of opposing hooks, 178 and 180; the first hook 178 being mounted inside the open top container 164 on the bottom surface 34 of the top platform 30, and the second hook 180 being pivotably mounted on the front face portion 170 of the open top drawer container 164 with a handle 182 in order to engage and disengage the first hook 178 from the second hook 180. The drawer 160 may be formed of various materials; for instance, the drawer may be formed substantially of sheet metal, plastic or suitable combinations thereof.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A modular utility cart comprising:
   a bottom platform, said bottom platform including a bottom surface and a top surface, said bottom surface including a plurality of casters secured thereto to provide movement to said modular utility cart,
   a plurality of support posts each having a bottom end and a top end, said bottom end of each said support post secured to said top surface of said bottom platform, a top platform separated vertically from said bottom platform by said plurality of said support posts, said top platform including a top surface and a bottom surface, said bottom surface of said top platform secured to said top end of said support posts, said support posts include a pair of first support posts and a pair of second support posts, wherein said top end of said first and said second support posts include at least one integrally formed intermeshing key, said intermeshing keys interlocking with conjugately shaped sockets formed into said bottom surface of said top platform, said first set of support posts are attached at a front end of said utility cart, said second set of support posts are attached at a back end of said utility cart, said top platform including an upstanding wall extending around the perimeter of said top platform wherein each said second support post is constructed to include an open faced U-shaped channel having a back wall and opposing sidewalls, said back wall including a plurality of open pockets, each open pocket having a top surface that is sized to cooperate with at least one bin to retain said at least one bin in position.

2. The modular storage cart of claim 1 wherein said top platform includes an integrated tool rail extending in a spaced and substantially parallel arrangement around the perimeter of said upstanding wall of said top platform to provide additional storage configurations, standoffs extending between an inner surface of said tool rail and an outer surface of said upstanding wall, said standoffs spaced apart around said perimeter providing several open grooves between said standoffs sized to cooperate with various hand tools and storage bins for secured storage thereof, said open grooves having both an open top and an open bottom to allow handles of tools placed within said standoffs to hang through said standoffs.

3. The modular storage cart of claim 1 wherein said first set of support posts are V-shaped when viewed from the top, having a radiused or beveled outer corner including a plurality of open notches along the length of each surface thereof and a plurality of cross braces for structural integrity, said cross braces also constructed and arranged to function as shelving supports that provide variable spacing for user configuration.

4. The modular storage cart of claim 3 wherein each said first support post includes an integrally formed bottom plate for attachment to said top surface of said bottom platform, said bottom platform including pockets that are conjugately shaped with respect to said bottom plates to hold said bottom plates in position under load.

5. The modular storage cart of claim 1 wherein said channel includes a plurality of integral shelves extending between said sidewalls.

6. The modular storage cart of claim 1 wherein slots are provided above the pockets in the form of openings that are constructed to allow at least one secondary platform to be slid into said slots and through to said first support posts where the distal ends of said secondary platforms are supported by said cross braces of said first support posts.

7. The modular storage cart of claim 1 wherein said top platform includes an ergonomic handle which may be rotated to provide different handle heights.

8. The modular storage cart of claim 7 wherein said top platform includes a pair of flanges extending outwardly from and positioned along opposite edges of one end of said top platform, each said flange is constructed as an open channel with a bottom portion of each channel being closed, a distal end of said channel sized to accommodate one leg portion of said handle, said handle U-shaped, having a first and second leg connected with a crossbar handle, whereby each leg is sized to be retained within said distal end of each said channel.

9. The modular storage cart of claim 8 wherein each said leg of said handle has a polygonal shape, whereby at least one side on said polygon abuts against said closed bottom portion of said channel to create a different fixed height for said crossbar of said handle.

10. The modular storage cart of claim 1 wherein V-grooves are provided along a top portion of said upstanding wall on said top platform for storage and transport of round items.

11. The modular storage cart of claim 1, further including V-grooves positioned adjacent said tool rail to allow said tool rail to be utilized as an anchor point to stabilize round objects in said V-grooves with rope.

12. The modular storage cart of claim 1 wherein said ladder rack is constructed of a steel wire that is attachable to said tool rail via secured hooks.

13. The modular storage cart of claim 12 wherein said secured hooks are inserted into said tool rail, whereby a rear side of said ladder rack presses against a side surface of said top platform with terminating ends of said secured hooks secured against said bottom surface of said top platform to prevent said ladder rack from becoming dislodged from said cart during movement of said cart.

14. The modular storage cart of claim 13 wherein said ladder rack is comprised of a quadrilateral base, a U-shaped front bar, a pair of rear angled bars, a cross brace, and said secured hooks, said quadrilateral base sized to accept the width of a ladder.

15. The modular storage cart of claim 1 wherein said bottom platform includes a pair of steering casters and a pair of non-steering casters, said steering and said non-steering casters secured to integrally formed bosses positioned on said bottom surface of said bottom platform, said steering casters including a locking assembly that allows said steering casters to either rotate freely for steering or be locked in a straight position with a user activated actuator.

16. The modular storage cart of claim 15 wherein each said steering caster includes a locking cylinder secured to said steering caster, a locking pin selectively engagable and disengagable to said locking cylinder to lock or allow free turning of a swivel bearing for swivelable or unidirectional movement of the caster.

17. The modular storage cart of claim 16 wherein a user operated actuator assembly is carried on said bottom surface of said bottom platform connected to said locking pin on each of said steering casters, said actuator assembly including an actuator arm having a first end, a pivot point attached to said bottom surface of said bottom platform, and a second end, said first end positioned between steering casters, with each said locking pin connected to said first end of said actuator arm via drag links, said second end extending horizontally beyond a distal end of said bottom platform and moveable in a horizontal plane parallel to said bottom platform, whereby movement of said second end of said actuator arm in a first direction withdraws said locking pin from said swivel bearing on each steering caster to allow for swivelable movement of said steering casters and movement of said second end of said actuator arm in a second direction allowing said locking pin to engage said swivel bearing, locking said steering casters in a fixed position.

18. The modular storage cart of claim 1 wherein said top platform includes a drawer secured adjacent said bottom surface thereof, said drawer configured to be moveable between a closed position and an open position, a front face portion of said drawer including a lock mechanism so that the user may secure the drawer in a closed position, said lock mechanism comprised of opposing hooks that engage each other to prevent opening of said drawer, a first hook being secured on said bottom surface of said top platform, and a second hook being pivotably mounted on a front face portion of said drawer, said second hook positioned on a first side of said pivot and a handle secured to said hook on a second side of said pivot.

19. A modular utility cart comprising:
  a bottom platform, said bottom platform including a bottom surface and a top surface, said bottom surface including a plurality of casters secured thereto to provide movement to said modular utility cart;
  a plurality of support posts each having a bottom end and a top end, said bottom end of each said support post secured to said top surface of said bottom platform, wherein said support posts include a pair of first support posts and a pair of second support posts, wherein said top end of said first and said second support posts include at least one integrally formed intermeshing key, said intermeshing keys interlocking with conjugately shaped sockets formed into said bottom surface of a top platform, wherein said first set of support posts are attached at a front end of said utility cart, said second set of support posts are attached at a back end of said utility cart, and wherein said first set of support posts are V-shaped when viewed from the top, having a radiused or beveled outer corner including a plurality of open notches along the length of each surface thereof and a plurality of cross braces for structural integrity, said cross braces also constructed and arranged to function as shelving supports that provide variable spacing for user configuration; and
  said top platform separated vertically from said bottom platform by said plurality of said support posts, said top platform including a top surface and a bottom surface, said bottom surface of said top platform secured to said top end of said support posts, said top platform including an upstanding wall extending around the perimeter of said top platform, an integrated tool rail extending in a spaced and substantially parallel arrangement around the perimeter of said upstanding wall of said top platform to provide additional storage configurations, standoffs extending between an inner surface of said tool rail and an outer surface of said upstanding wall, said standoffs spaced apart around said perimeter providing several open grooves between said standoffs sized to cooperate with various hand tools and storage bins for secured storage thereof and a ladder rack securable to said tool rail.

* * * * *